United States Patent
Pulford et al.

(10) Patent No.: US 6,243,037 B1
(45) Date of Patent: Jun. 5, 2001

(54) TRACKING METHOD FOR A RADAR SYSTEM

(75) Inventors: Graham William Pulford, Glen Iris; Robert Keith Jarrott, Ringwood North; Robin John Evans, Aspendale, all of (AU)

(73) Assignee: The Commonwealth of Australia, Canberra (AU)

(*) Notice: Subject to any disclaimer, the term of this patent is extended or adjusted under 35 U.S.C. 154(b) by 0 days.

(21) Appl. No.: 09/117,584

(22) PCT Filed: Dec. 19, 1996

(86) PCT No.: PCT/AU96/00817

§ 371 Date: Jun. 18, 1998

§ 102(e) Date: Jun. 18, 1998

(87) PCT Pub. No.: WO97/22889

PCT Pub. Date: Jun. 26, 1997

(30) Foreign Application Priority Data

Dec. 19, 1995 (AU) .................................................. PN7226

(51) Int. Cl.$^7$ ...................................................... G01S 13/72
(52) U.S. Cl. ......................... 342/95; 342/96; 342/97; 342/107; 342/136; 342/140; 342/148
(58) Field of Search .............................. 342/73, 77, 81, 342/90, 94, 95, 96, 97, 107, 108, 110, 115, 125, 126, 135, 136, 140, 145, 148, 156, 157, 158, 162, 189, 195

(56) References Cited

U.S. PATENT DOCUMENTS

| | | | | |
|---|---|---|---|---|
| 3,731,304 | * | 5/1973 | Caspers et al. | 342/90 |
| 3,905,032 | * | 9/1975 | Truel et al. | 342/90 |
| 4,005,415 | * | 1/1977 | Kossiakoff et al. | 342/90 |
| 5,001,650 | * | 3/1991 | Francis et al. | 364/516 |
| 5,202,691 | * | 4/1993 | Hicks | 342/90 |
| 5,379,044 | * | 1/1995 | Carlson et al. | 342/90 |
| 5,400,264 | * | 3/1995 | Phillis et al. | 364/516 |
| 5,414,643 | * | 5/1995 | Blackman et al. | 364/516 |
| 5,537,119 | * | 7/1996 | Poore, Jr. | 342/96 |
| 5,798,942 | * | 8/1998 | Danchick et al. | 364/516 |
| 5,940,523 | * | 8/1999 | Cornman et al. | 382/100 |

FOREIGN PATENT DOCUMENTS

| | | | |
|---|---|---|---|
| 20351/92 | 1/1993 | (AU) | G01S/13/72 |
| 2 284 054 | 5/1995 | (GB) | G01S/5/00 |
| 94/09382 | 4/1994 | (WO) | G01S/13/72 |

OTHER PUBLICATIONS

Van Keuk, G., "Multihypothesis Tracking With Electronically Scanned Radar," IEEE Transactions on Aerospace and Electronic Systems, 31(3):916–927 (Jul. 1995).

Bar–Shalom, Y. and Kumar, A., "Tracking Low Elevation Targets in the Presence of Multipath Propagation," IEEE Transactions on Aerospace and Electronic Systems, 30(3):973–979 (Jul. 1994).

"Use of multiple hypotheses in radar tracking", Bath, W.G., Radar 92, International Conference, 1992, pp: 90–93.*

"Multi–sensor, probabilistic multi–hypothesis tracking", Krieg, M.L.; Gray, D.A., Data Fusion Symposium, 1996. ADFS '96., First Australian, 1996, pp: 153–158.*

"Application of the unifying approach to multiple target tracking", Chung, Y.–N., Radar Conference, 1990., Record of the IEEE 1990 International, 1990, pp: 615–620.*

"Data association and tracking using hidden Markov models and dynamic programming", Martinerie, F.; Forster, P., Acoustics, Speech, and Signal Processing, 1992. ICASSP–92., 1992 IEEE International Conference on, Vol: 2, 1992, pp: 449–452.*

* cited by examiner

Primary Examiner—John B. Sotomayor
(74) Attorney, Agent, or Firm—Flehr Hohbach Test Albritton & Herbert LLP (57) ABSTRACT

A tracking method for a signal echo system, including generating a plurality of gates for respective propagation modes on the basis of a target state prediction for a dwell time, and generating a target state estimate for the dwell time on the basis of target measurement points which fall within the gates.

10 Claims, 5 Drawing Sheets

TRACKING METHOD FOR A RADAR SYSTEM

FIELD OF THE INVENTION

The present invention relates to a tracking method for a radar system, such as a phased array radar system or a bistatic radar system. Although the following discusses use for radar systems, the invention could also be applied to other signal echo systems, such as sonar systems.

BACKGROUND OF THE INVENTION

Radar signals returned from a target allow information to be determined concerning the slant range, azimuth and speed of a target relative to the receiving system of the radar system. The receiving system however normally receives a number of signals returned from the target which have different propagation paths or modes. Noise received by and induced in the receiving system can also be mistaken for a return signal from the target and needs to be taken into account. Tracking methods have been employed which track a target on the basis of signals relating to one propagation mode. Yet selecting one propagation mode neglects information relating to other modes which can be used to enhance the accuracy and sensitivity of the tracking method.

BRIEF SUMMARY OF THE INVENTION

In accordance with the present invention there is provided a tracking method for a signal echo system, including:

generating a plurality of gates for respective propagation modes on the basis of a target state prediction for a dwell time; and generating a target state estimate for said dwell time on the basis of target measurement points which fall within said gates.

The present invention provides a tracking method for a signal echo system, including:

obtaining target measurement points for a dwell time;

initiating tracking by obtaining an initial target state estimate from at least one of said points;

determining a target state prediction for a subsequent dwell time on the basis of said target state estimate;

generating a plurality of gates for respective propagation modes on the basis of the target state prediction; and generating a target state estimate for said subsequent dwell time on the basis of target measurement points for said subsequent dwell time which are within said gates.

The target state estimate may be generated by applying association hypotheses to said measurement points in said gates and association probabilities to said hypotheses, obtaining conditional state estimates from the measurement points for each hypothesis and summing said conditional state estimates multiplied by said probabilities.

The tracking initiating step can advantageously be performed for a plurality of propagation modes to initiate a plurality of tracking filters by generating a plurality of said target state estimates for said subsequent dwell time.

The present invention further provides a tracking method for a signal echo system, including extending a target state vector to include additional parameters associated with a plurality of propagation modes, and accounting for measurement uncertainty associated with propagation path characteristics for said modes when updating target state estimates.

BRIEF DESCRIPTION OF THE DRAWINGS

A preferred embodiment of the present invention is hereinafter described, by way of example only, with reference to the accompanying drawings, wherein.

DETAILED DESCRIPTION OF THE INVENTION

Bistatic radar systems employ separate transmitter and receiver sites, and include Over The Horizon Radar (OTHR) systems which direct transmission signals above the horizon for refraction by the ionosphere, known as skywave systems. OTHR systems also include surface wave radar systems which propagate radar waves along the surface of saltwater, and rely on the receiving system being able to detect objects by the radar signals reflected therefrom.

Figure 1:
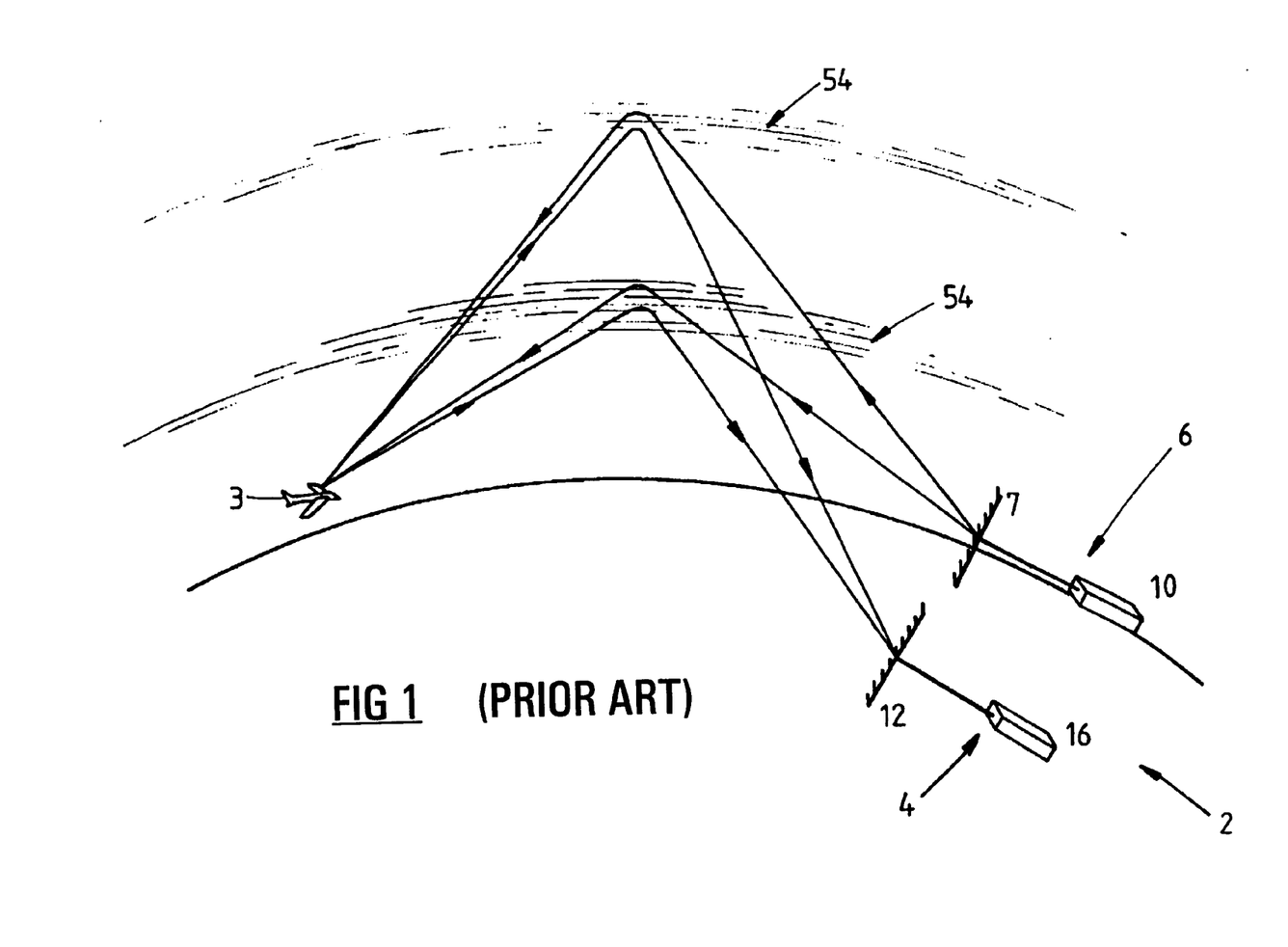
FIG. 1 is a schematic diagram of an over the horizon radar (OTHR) system, according to the prior art.

An OTHR system 2, as shown in FIG. 1, includes a receiving system 4 and a transmitting system 6. The transmitting system 6 comprises an in-line array 7 of transmitting antennas located at the transmitter site and a control system 10 for feeding electrical signals to the antennas. The receiving system 4 comprises an in-line array 12 of receiving antennas and a control system 16 for processing the signals received by the antennas, which are located at the receiver site. OTHR systems include the Jindalee Facility in Alice Springs (JFAS) and the U.S. Navy's ROTHR system.

The broad transmitting beam of the radar is directed towards areas of the ionosphere from which refracted signals are redirected to monitor a target 3. The beam is effectively directed to a region or area in which a target is located. A number of targets may be located in one region and the receiver control system 16 is able to divide the energy returned from the illuminated region into a dozen smaller beams which can then each be divided into a plurality of range cells that are characterised by a respective distance from the receiving system 4. This allows the receiving system 4 to track a number of targets which are located in the illuminated region. The receive beams can also be divided into a plurality of velocity cells characterised by an object's velocity relative to the receiving system 4. This allows targets to be separated on the basis of their velocity if they cannot be separated on the basis of their distance from the receiving system 4. The transmitting and receiving beams can be moved or swept in synchronism, through a number of beam steer positions, with the time being spent at any given position being referred to as the dwell time. Measurements obtained from the radar signals or echoes received during each dwell time are referred to as dwells.

The control software of the control system 16 is able to obtain four parameters pertaining to a target from each dwell, and these are the propagation path length or slant range (R), azimuth (A), Doppler frequency shift or radial speed (D) and signal strength based on a signal to noise ratio (SNR) measurement. These are referred to as the RAD or radar coordinates. The set of measurements from a dwell also includes clutter and detections from other targets.

Figure 2:
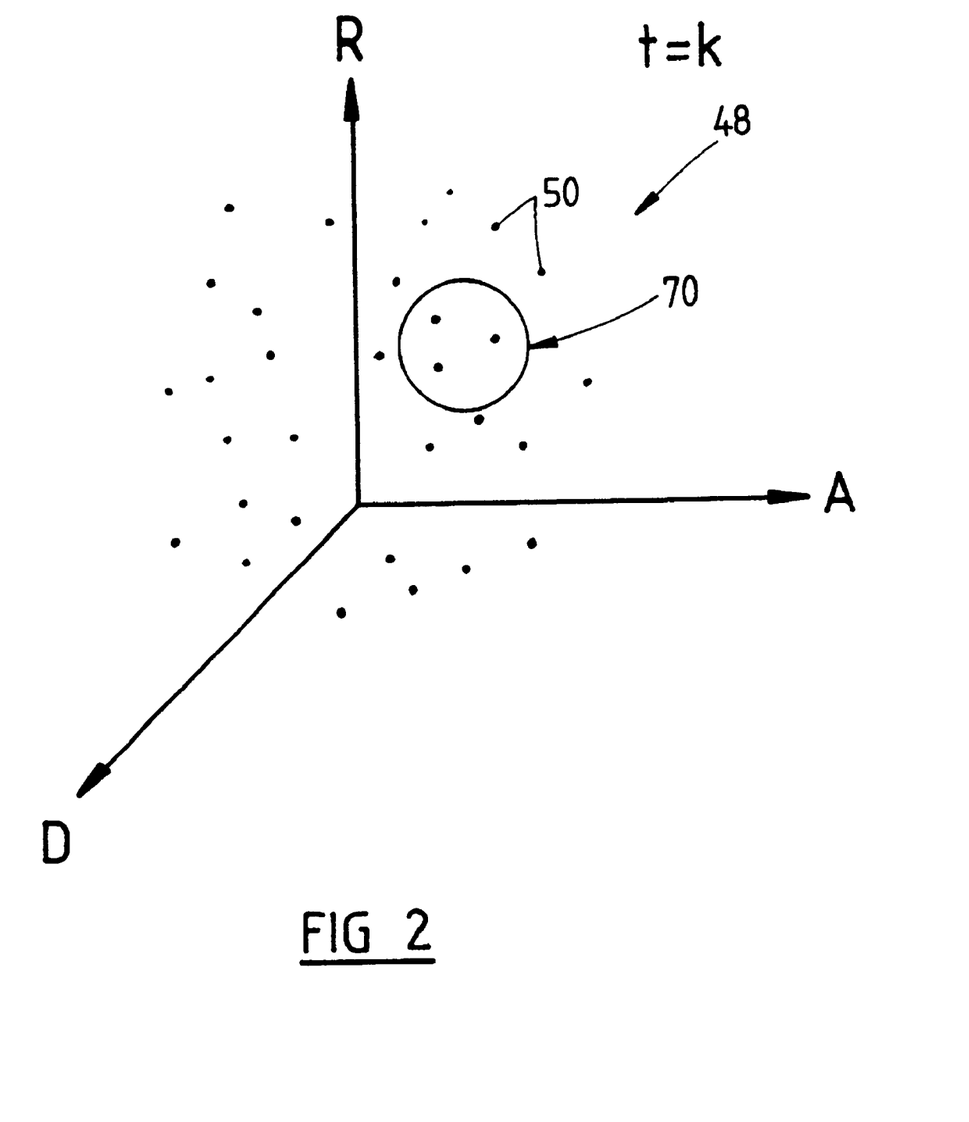
FIG. 2 is a diagram of a measurement frame of reference.
Figure 3:
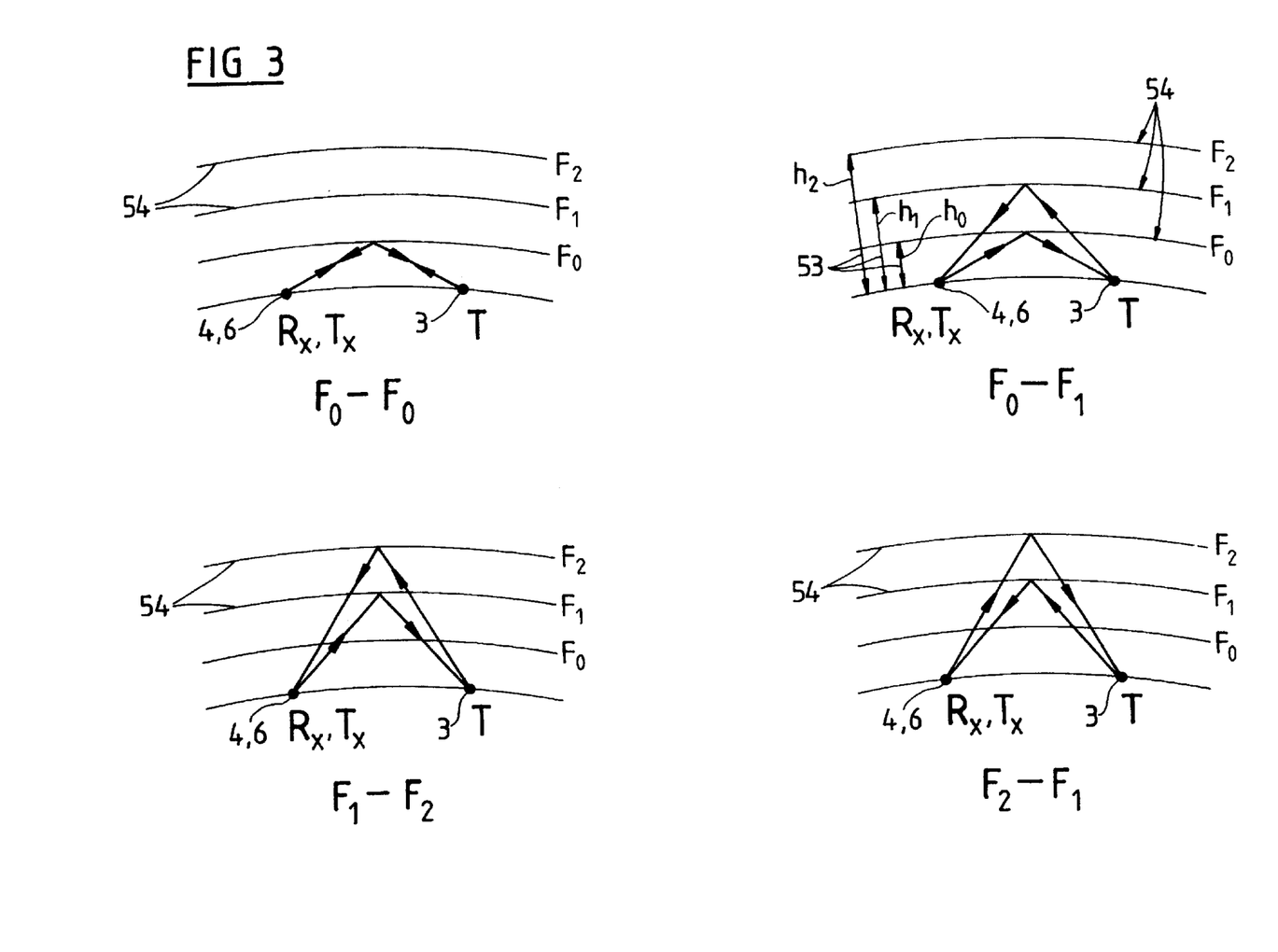
FIG. 3 is a diagram of possible propagation modes.

The dwells can be graphically represented by plotting them as candidate detection points on a three dimensional axis, as shown in FIG. 2, for dwell t=k, where one axis represents R, the other A and the third the D values. For any dwell time t=k of the order of 100 or 1000 candidate detection points 50 may be determined by the receiving system 4. Some of the points 50 may correspond to a target and others may simply relate to clutter echoes or noise intrinsic in the transmitting system 6 or receiving system 4. Clutter echoes arise from backscatter from the ground or objects which are not of interest, such as meteors. The OTHR system 2 is also subject to multipath propagation in that there is more than one single path for echoes returned from a target due to a number of different ionospheric layers 54 at different heights 53 which refract echoes down to the receiving system 4. as shown in FIG. 3. There may be up to four different reflecting layers $F_0$, $F_1$, $F_2$ and $F_3$ resulting in several echoes returned from a target, corresponding to reflections from combinations of these layers. Propagation modes are described by the layers from which the signal is refracted. For example, $F_0$–$F_1$ is the propagation mode for a transmit path via layer $F_0$ and a receive path via layer $F_1$, where T represents the target 3, as shown in FIG. 3. Whilst the propagation path for a candidate detection point 50 is not known, the height of the different layers can be determined using commercial ionospheric sounders which provides some information concerning the relationship between points of different propagation modes for the same target. Knowing the heights and properties of each layer gives an indication as to expected RAD measurements of different propagation modes.

The state of the target, at a given dwell k, can be represented by $$x(k) = \begin{pmatrix} r(k) \\ \dot{r}(k) \\ a(k) \\ \dot{a}(k) \end{pmatrix} \quad (1)$$

where r is the range, a the azimuth, $\dot{r}$ the range rate and $\dot{a}$ the azimuth rate. Equations of motion can be used to describe the target dynamics, for example, a constant velocity target would, if the time T between dwells were constant, obey $$r(k)=r(0)+\dot{r}kT$$

$$a(k)=a(0)+\dot{a}kT. \quad (2)$$

This can be expressed in known state-space form as $$x(k+1)=F(k) \times (k)+v(k) \quad (3)$$

where F(k) is a known matrix, for instance in the case of a constant velocity target $$F(k) = \begin{pmatrix} 1 & T_k & 0 & 0 \\ 0 & 1 & 0 & 0 \\ 0 & 0 & 1 & T_k \\ 0 & 0 & 0 & 1 \end{pmatrix} \quad (4)$$

where $T_k$ is the time between dwells k and k+1. The term v(k) represents zero-mean, white Gaussian process noise as used in standard Kalman filtering. The covariance matrix Q(k) of v(k) is assumed to be known.

Figure 4:
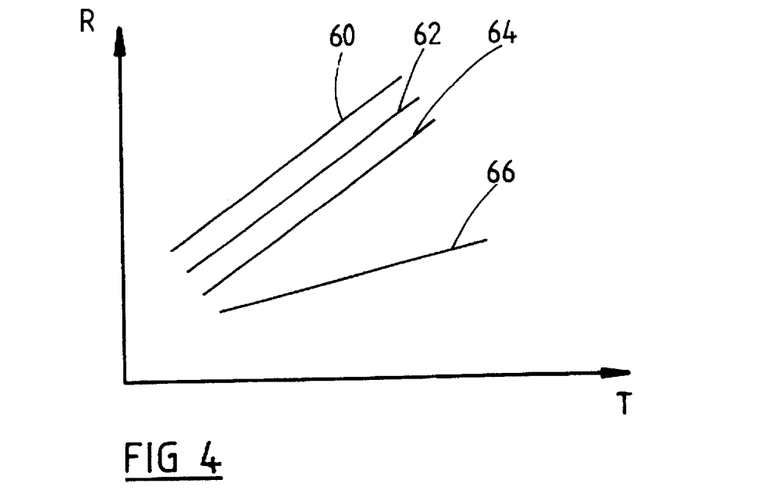
FIG. 4 is a graph of target tracks.

A currently used tracking method, based on the probabilistic data association (PDA) filter, as described in Y. Bar-Shalom and T. E. Fortmann, "Tracking and Data Association", Academic Press, 1988. performs tracking in the radar coordinates R, D, A, A, as illustrated in FIG. 2. A track is initiated by selection of a single, noisy measurement 50 with the unknown azimuth rate A being initially set to correspond with a hypothesised azimuth crossing rate, usually zero. Further measurement selection is accomplished by taking only those measurements which fall inside a validation gate 70 around the next expected position of the target measurement. This method does not require knowledge of the mapping of radar to ground coordinates during tracking. A disadvantage of this method is that it fails to use the information conveyed by multiple detections arising from multipath propagation. Also the presence of multipath propagation may cause multiple tracks 60, 62 and 64 to be generated for a single target, as shown in FIG. 4, when tracking is performed in radar coordinates using conventional filters such as PDA. If the tracks 62 and 64 closely conform with the expected separations for the hypothesised modes, they can be considered to relate to the same target 52 of FIG. 5, whereas a track 66 which diverges excessively can be dismissed as corresponding to another target or to clutter. Such a situation, commonly arising in conventional PDA tracking, requires a fusion or clustering operation to group multimode tracks pertaining to the same target together. This allows a track to be identified with a particular propagation mode. A further stage of coordinate registration is then required to map the tracks to ground coordinates for geographical display to the radar operators.

The preferred embodiment described herein uses explicit knowledge of the ionospheric structure including virtual heights, as provided by ionospheric sounders or by other means, to account for and take advantage of multipath propagation during track initiation and tracking. This is distinct from conventional approaches which only expect a single detection per target and are unable to benefit from the additional target-related information conveyed by multipath detections. The gain in tracking performance arising from multipath detections of a single target is important when the probability of target detection via some or all of the various propagation modes is low.

Figure 5:
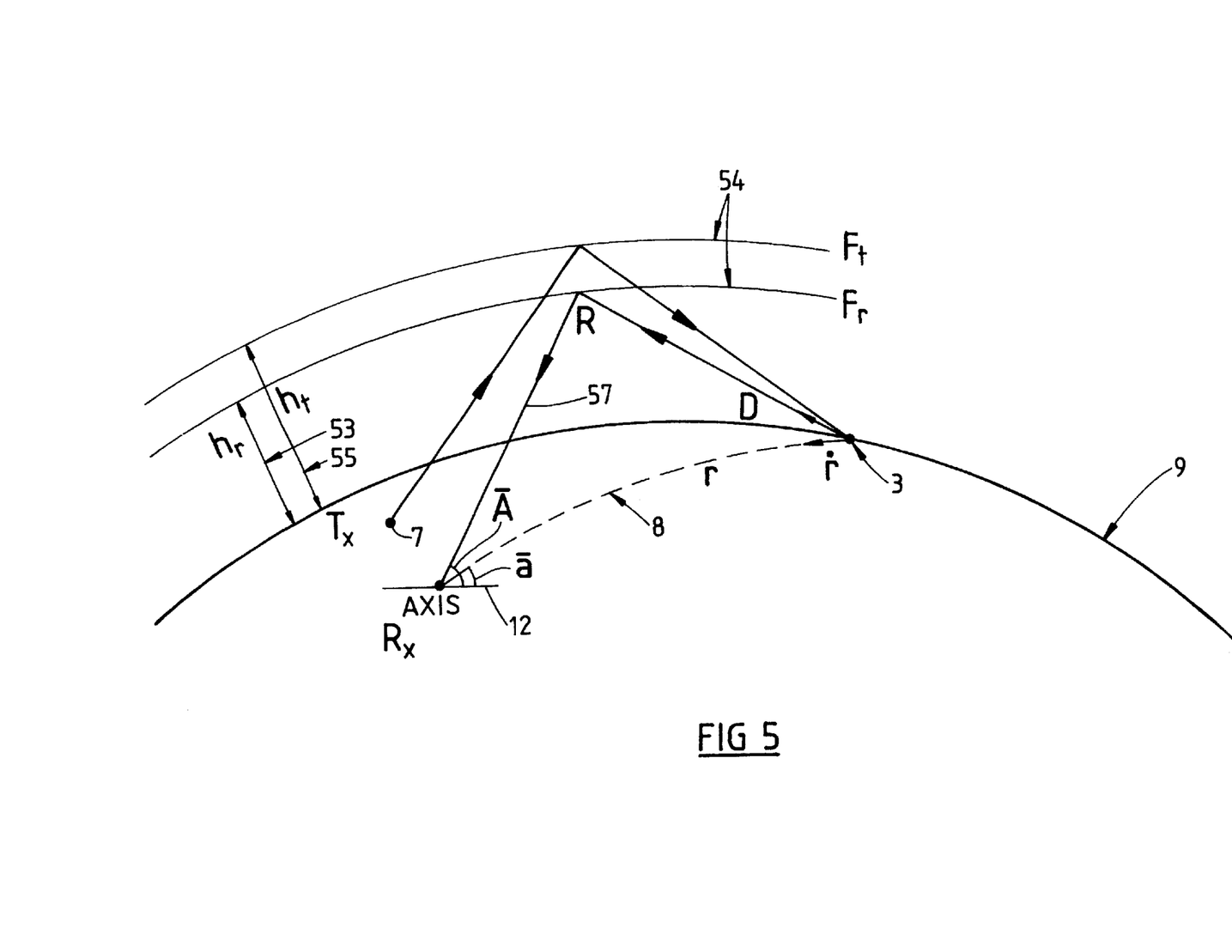
FIG. 5 is a diagram of measurement geometry of the system.

The target state is taken to be as in equation (1), where r is the ground range 8 across the surface of the earth 9, a is the true azimuth, $\dot{r}$ is the ground range rate and a is the true azimuth rate. The true azimuth a is the complement of the angle $\bar{a}$, which is the angle between the projected ground range r and the axis of the receiver array 12, as shown in FIG. 5, i.e. a=(90°−$\bar{a}$). Tracking is performed in ground coordinates, although other frames of reference, for instance a preferred propagation mode, may be used to describe the target dynamics and relate these to the other measurement coordinates.

The conversion between the ground and radar coordinates can be represented as $$\begin{pmatrix} R(k) \\ A(k) \\ D(k) \end{pmatrix} = H(r(k), a(k), \dot{r}(k); h_r, h_t) \quad (5)$$

where, at time k, R is the measured slant range, A the measured azimuth, D the Doppler speed (slant range rate), $h_r$ the virtual ionospheric height 53 on the receive path, and $h_t$ the virtual ionospheric height 54 on the transmit path, as shown in FIG. 5. The slant range R may be defined as one half of the total path length from the transmitter 7 via the target 52 to the receiver 4. The measured azimuth or coning angle A is the complement of the angle $\bar{A}$ between the incoming ray 57 and the axis of receiver array axis 12. The Doppler speed D is proportional to the rate of change of the total path length.

The various propagation modes can be labelled according to the corresponding outbound and return propagation mode combination $F_0$–$F_0$, $F_0$–$F_1$, $F_1$–$F_0$, ..., $F_2$–$F_2$ for a target 52, as shown in FIG. 3. For four possible ionospheric layers $F_0$, $F_1$, $F_2$, $F_3$ with heights $h_0$, $h_1$, $h_2$, $h_3$, these modes may be numbered from 1 to 16 respectively. Hence we may write the measurement process for the various propagation modes in terms of the target state x(k) as $$y(k) = \begin{cases} H_1(x(k)) + w_1(k) \text{ for mode } F_0 - F_0 \\ H_2(x(k)) + w_2(k) \text{ for mode } F_0 - F_1 \\ \vdots \\ H_n(x(k)) + w_n(k) \text{ for mode } n \end{cases} \quad (6)$$

where $H_1(x(k))=H(r(k), a(k), \dot{r}(k); h_0, h_0)$, $H_2(x(k))=H(r(k), a(k), \dot{r}(k); h_0, h_1)$, etc., and the assumed number of possible propagation modes n may vary with time. In the above, $w_i(k)$ is a zero-mean, white Gaussian sequence with known covariance $R_i(k)$ representing the assumed measurement noise terms. The actual form of the non-linear measurement functions $H_i(\cdot)$ above is determined by the geometry of the ionospheric model as shown in FIG. 5, and will depend on the virtual heights of the ionospheric layers $h_r$ and $h_t$ 53 and 55, and the location and separation of the receiver and transmitter arrays 7 and 12, among other factors.

Since the virtual ionospheric heights $h_i$ in FIG. 5 may only be approximately known, but are assumed to vary slowly in comparison with the target dynamics, they can be included in the state vector x(k) and estimated along with the dynamical variables describing the target. In this case we have instead of equation (1)

$$x(k) = \begin{pmatrix} r(k) \\ \dot{r}(k) \\ a(k) \\ \dot{a}(k) \\ h_1(k) \\ \vdots \\ h_n(k) \end{pmatrix} \quad (7)$$

with each virtual height satisfying an equation of the form $$h_i(k+1)=h_i(k)+v_i(k) \quad (8)$$

where $v_i(k)$ is a small process noise term.

Converting to the ground frame of reference requires the selection of an outbound and return propagation mode combination $F_t$ and $F_r$ with corresponding virtual heights $h_t$ and $h_r$.

The inverse transformation to equation (5) can be represented by $$\begin{pmatrix} r(k) \\ a(k) \\ \dot{r}(k) \end{pmatrix} = H^{-1}(R(k), A(k), D(k); h_r, h_t) \quad (9)$$

and follows from the assumed geometry indicated in FIG. 5.

Hereinafter the state prediction and associated prediction covariance are denoted by $\hat{x}(k|k-1)$ and $P(k|k-1)$ and an updated state estimate and state error covariance are denoted by $\hat{x}(k|k)$ and $P(k|k)$.

At some arbitrary time 0, tracking is initiated by selecting an initial point 50 which may correspond to a hitherto unobserved target. Since the propagation mode which gave rise to this measurement is a priori unknown, an initial target state estimate $\hat{x}(0|0)$ for equation (1) cannot be inferred from equation (9) unless a given propagation mode, or equivalently the ionospheric heights for the transmit and receive paths, is assumed. The preferred method is therefore to initialise n tracking filters, one for each possible initial propagation mode. Each filter assumes a particular initial propagation mode with corresponding virtual heights $h_r$ and $h_t$ in order to assign its initial state estimate using equation (9) based on the first measurement point 50. The estimate of the initial target azimuth rate is set to some starting value, usually zero. An initial state error covariance $P(0|0)$ is also assigned and is taken to be large enough to cover the initial uncertainty in target position and velocity. Other methods of initialisation are possible using data from more than a single radar dwell; but the previously described method is the simplest among these. Of the n filters initiated from the measurement 50, the filter based on the correct initial propagation mode assumption can be expected to perform the best and thus its state estimates would be more accurate (in the sense of having smaller errors on average) than those of the other filters initiated with it. As the processing proceeds, it becomes clear by observation of the state estimates which, if any, of the n filters initiated as above is compatible with a target whose dynamical model is assumed to be as expressed in equation (2).

The recursive processing required by each tracking filter, initialised as above, is now described. The aim of the processing is to compute, in a recursive manner, approximate conditional mean $\hat{x}(k|k)$ and covariance $P(k|k)$ estimates of the target state, based on the measurement data, including virtual ionospheric height measurements, up to time k, $Y(1), \ldots, Y(k)$, where $Y(i)$ represents the set of measurements received in dwell i. The estimated target track is provided by plotting the range and azimuth values from $\hat{x}(k|k)$. The accuracy of the track is indicated by the size of the standard deviations which can be obtained from the state error covariance $P(k|k)$.

Figure 6:
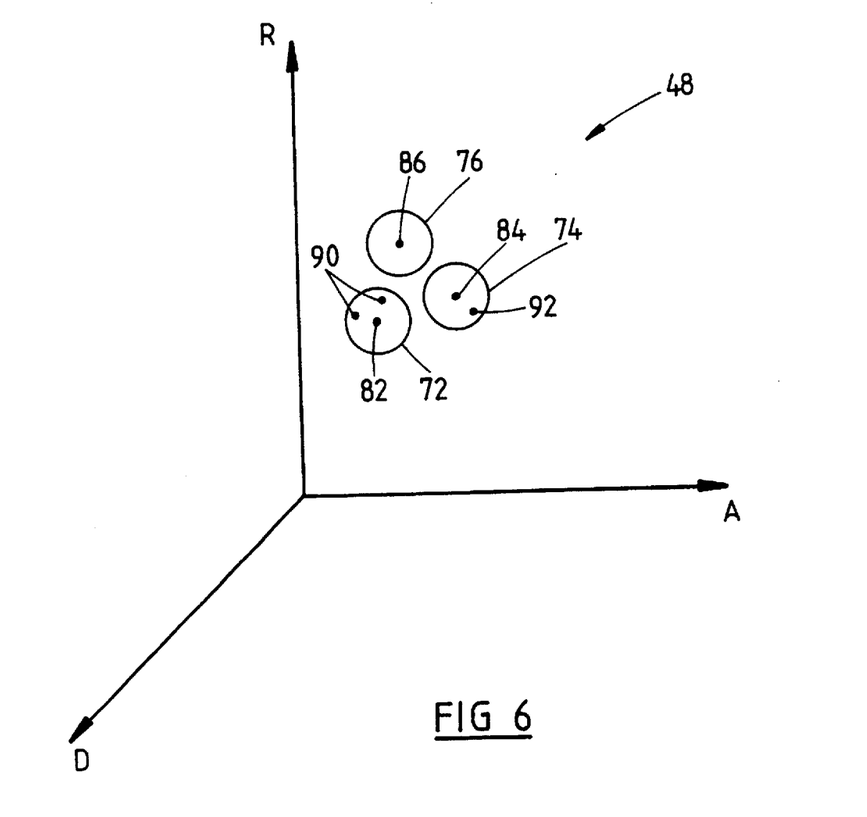
FIG. 6 is a diagram of multiple gates for target state estimation.

The dynamical target model of equation (3) is used to predict where each measurement would appear during the next dwell in the absence of measurement noise under each propagation mode. The state prediction $\hat{x}(1|0)$ at time 1 is given, in the usual manner of Kalman filtering, as described in Y. Bar-Shalom and T. E. Fortmann, "Tracking and Data Association", Academic Press, 1988, as $$\hat{x}(1|0)=F(0)\hat{x}(0|0) \quad (10)$$

with associated covariance $$P(1|0)=F(0)P(0|0)F'(0)+Q(0) \quad (11)$$

where F' is the transpose of the transition matrix F in equation (3). Instead of generating one gate 70, $\hat{x}(1|0)$ is used to generate n gates 72, 74 and 76 in the measurement space for each tracking filter, corresponding to the respective propagation modes $F_0$–$F_0$, $F_0$–$F_1$, ..., etc., as shown in FIG. 6. The measurement predictions for the respective propagation modes are therefore $$\hat{y}_1(1|0) = H_1(\hat{x}(1|0)) \quad (12)$$
$$\hat{y}_2(1|0) = H_2(\hat{x}(1|0))$$
$$\vdots$$
$$\hat{y}_n(1|0) = H_n(\hat{x}(1|0)).$$

The associated measurement prediction covariances are $$S_1(1) = J_1(1)P(1|0)J_1'(1) + R_1(1) \quad (13)$$

$$S_2(1) = J_2(1)P(1|0)J_2'(1) + R_2(1)$$

$$\vdots$$

$$S_n(1) = J_n(1)P(1|0)J_n'(1) + R_n(1)$$

where $J_i(1)$ is the Jacobian matrix of the non-linear measurement function $H_i(\cdot)$ in equation (6) evaluated at the state predictions $\hat{x}(1|0)$. The validation gate for each propagation mode is an ellipsoidal region in RAD space defined by $$G_i(1) = \{y \in \mathbb{R}^3 : [y - \hat{y}_i(1|0)]'S_i(1)^{-1}[y - \hat{y}_i(1|0)] < \gamma_i\} \quad (14)$$

where $\gamma_i$, defines the size of the validation gate. The probability that a target falls inside the gate i is denoted $P_G^i$, while the probability of detecting a target via the ith propagation mode is denoted $P_D^i$. This is illustrated in FIG. 6 for three gates 72, 74 and 76 centred on measurement predictions 82, 84 and 86 for three propagation modes $F_0$–$F_0$, $F_0$–$F_1$, ..., etc. The gates may or may not overlap. The validation region is defined as the union of the validation gates or some region which includes their union. Points which fall inside the validation gates are accepted as possibly relating to the target 52 and are used together with the state prediction $\hat{x}(1|0)$ in order to update the state estimate $\hat{x}(0|0)$ to yield $\hat{x}(1|1)$. The corresponding state error covariance is also updated to $P(1|1)$. This process is recursive and can be represented as follows:

$$\hat{x}(0|0) \to \hat{x}(1|0) \to \hat{x}(1|1) \to \hat{x}(2|1) \to \ldots$$

$$P(0|0) \to P(1|0) \to P(1|1) \to P(2|1) \to \ldots \quad (15)$$

The state estimate $\hat{x}(k|k)$ is an approximate minimum-mean-square-error estimate of the target state $x(k)$ based on all the information 48 from dwells 0 through k of the form given in FIG. 2 including multiple detections of the same target due to multipath propagation. The estimate is approximate because it assumes that the probability density function of the true target state is Gaussian conditioned on all the measurement data.

To determine the updated target state $\hat{x}(k|k)$ and its covariance $P(k|k)$, the measurements falling within the gates 72, 74, 76. etc. are used in a probabilistic data association framework as described in Y. Bar-Shalom and T. E. Fortmann, "Tracking and Data Association", Academic Press, 1988. which, in addition to consideration of a measurement being from a target or due to clutter, includes association hypotheses for the possible propagation modes which may have produced the measurements. A target existence or confidence model is also incorporated in the filter as described in S. B. Colegrove, A. W. Davis and J. K. Ayliffe, "Track Initiation and Nearest Neighbours Incorporated into Probabilistic Data Association", J. Elec. and Electronic Eng., Australia, Vol. 6. No. 3, pp. 191–198, 1986, to aid in track maintenance (confirmation, deletion, etc.). The probability that the target exists at time k given data to time k is denoted $P_E(k|k)$. Target existence is modelled as a 2-state Markov Chain so that the predicted probability of target existence $P_E(k|k-1)$ satisfies $$P_E(k|k-1) = \Delta_0 P_E(k-1|k-1) + \Delta_1\{1 - P_E(k-1|k-1)\} \quad (16)$$

where the two transition probabilities $\Delta_0$ and $\Delta_1$ are defined by $\Delta_0$=Pr(target exists at time k|target exists at time k-1)

$\Delta_1$=Pr(target exists at time k|target does not exist at time k-1)

An arbitrary initial value of $P_E(0|0)=0.5$ is assumed.

As an illustration of the filtering procedure, consider gates 72 and 74 associated with propagation modes $F_0$–$F_0$ and $F_0$–$F_1$, and gate 76 associated with propagation mode $F_1$–$F_1$, with respective centres given by the measurement predictions $\hat{y}_1(k|k-1)$, $\hat{y}_2(k|k-1)$ and $y_3(k|k-1)$, 82, 84 and 86. We will number these propagation modes as 1, 2 and 3, respectively when referring to the measurement predictions. Suppose that the gate 72 contains two measurements $y_1$, $Y_2$ 90 and that gate 74 contains one measurement $y_3$ 92, while gate 76 does not contain any measurements. The 7 association hypothesis (numbered from −1 to 5) which can be applied are:

(−1) The target does not exist.

(0) The target exists but all validated measurements $y_1$, $y_2$ and $y_3$ are clutter.

(1) $y_3$ and $y_3$ are clutter, $y_2$ is a target detection via propagation mode $F_0$–$F_0$.

(2) $y_2$ and $y_3$ are clutter, $y_1$ is a target detection via propagation mode $F_0$–$F_0$.

(3) $y_3$ is a target detection via $F_0$–$F_1$, and both $y_1$, and $y_2$ are clutter.

(4) $y_3$ is a target detection via $F_0$–$F_1$, $y_1$ is a target detection via $F_0$–$F_0$ and $y_2$ is clutter.

(5) $y_3$ is a target detection via $F_0$–$F_1$, $Y_2$ is a target detection via $F_0$–$F_0$ and $y_1$ is clutter.

For each of the possible associated hypothesis above, a conditional target state estimate $\hat{x}_i(k|k)$ can be formed from the predicted state estimate $\hat{x}(k|k-1)$ using the extended Kalman filter theory, as described in G. W. Pulford and R. J. Evans, "Probabilistic Data Association for Systems with Multiple Simultaneous Measurements", Automatica, Vol. 32. No. 9. pp. 1311–1316, 1996. Omitting some time indexes and writing $\bar{x}=\hat{x}(k|k-1)$ for equation (10), $\bar{P}=P(k|k-1)$ for equation (11), and $\bar{y}_i=\hat{y}_i(k|k-1)$ for equation (12), the conditional state estimates in this case are given by $$\hat{x}_{-1}(k|k) = \bar{x} \quad (17)$$

$$\hat{x}_0(k|k) = \bar{x}$$

$$\hat{x}_1(k|k) = \bar{x} + \bar{P}J_1'S_1^{-1}\{y_2 - \bar{y}_1\}$$

$$\hat{x}_2(k|k) = \bar{x} + \bar{P}J_1'S_1^{-1}\{y_1 - \bar{y}_1\}$$

$$\hat{x}_3(k|k) = \bar{x} + \bar{P}J_2'S_2^{-1}\{y_3 - \bar{y}_2\}$$

$$\hat{x}_4(k|k) = \bar{x} + \bar{P}(J_1' J_2')\begin{pmatrix} S_1 & J_1\bar{P}J_2' \\ J_2\bar{P}J_1' & S_2 \end{pmatrix}^{-1}\begin{pmatrix} y_1 - \bar{y}_1 \\ y_3 - \bar{y}_2 \end{pmatrix}$$

$$\hat{x}_5(k|k) = \bar{x} + \bar{P}(J_1' J_2')\begin{pmatrix} S_1 & J_1\bar{P}J_2' \\ J_2\bar{P}J_1' & S_2 \end{pmatrix}^{-1}\begin{pmatrix} y_2 - \bar{y}_1 \\ y_3 - \bar{y}_2 \end{pmatrix}$$

where the terms $J_i$; and $S_i$ are as in equation (13). The corresponding conditional state error covariances $P_i(k|k)$ are given by $$P_{-1}(k|k) = c\bar{P} \quad (18)$$

$$P_0(k|k) = \bar{P}$$

$$P_1(k|k) = \bar{P} - \bar{P}J_1'S_1^{-1}J_1\bar{P}$$

$$P_2(k|k) = \bar{P} - \bar{P}J_1'S_1^{-1}J_1\bar{P}$$

$$P_3(k|k) = \bar{P} - \bar{P}J_2'S_2^{-1}J_2\bar{P}$$

$$P_4(k|k) = \bar{P} - \bar{P}(J_1'J_2')\begin{pmatrix} S_1 & J_1\bar{P}J_2' \\ J_2\bar{P}J_1' & S_2 \end{pmatrix}\begin{pmatrix} J_1 \\ J_2 \end{pmatrix}\bar{P}$$

$$P_5(k|k) = \bar{P} - \bar{P}(J_1'J_2')\begin{pmatrix} S_1 & J_1\bar{P}J_2' \\ J_2\bar{P}J_1' & S_2 \end{pmatrix}\begin{pmatrix} J_1 \\ J_2 \end{pmatrix}\bar{P}$$

where $c \geq 1$ is a scaling factor reflecting the increased uncertainty in the case that the target does not exist.

The computation of the probability of each associated hypothesis, called the association probability, can be illustrated by assuming uniformly distributed clutter measurements in the radar measurement space, and a Poisson model, as described in Y. Bar-Shalom and T. E. Fortmann, "Tracking and Data Association", Academic Press, 1988, with spatial density $\lambda$ for the number of clutter points inside the validation region. Also, we let the probability of target detection $P_D$ via any propagation mode be identical, and the gate probabilities $P_G$ be identical. $P_D$ and $P_G$ are parameters that are given values which are selected to extract optimum performance from the tracking method given the operating characteristics of the system 2. The total volume of the validation gates at time k is $V_k$. If two or more of the gates overlap, $V_k$ can be approximated, for instance, as the volume of the largest gate. The association probabilities $\beta_i(k)$, defined as the probability of the respective association hypothesis i conditioned on all measurement data up to the current time k, can be expressed as described in G. W. Pulford and R. J. Evans, "Probabilistic Data Association for Systems with Multiple Simultaneous Measurements", Automatica, Vol. 32. No. 9. pp. 1311–1316, 1996, by:

$$\beta_{-1}(k) = \delta^{-1}(k)\{1 - P_E(k|k - 1)\}\exp(-\lambda V_k)\lambda^3/3! \quad (19)$$

$$\beta_0(k) = \delta^{-1}(k)(1 - P_D P_G)^3 \lambda^3 \exp(-\lambda V_k) P_E(k|k - 1)/3!$$

$$\beta_1(k) = \delta^{-1}(k)P_D(1 - P_D P_G)^2 \lambda^2 \exp(-\lambda V_k)$$
$$N\{y_2; \bar{y}_1, S_1\}P_E(k|k - 1)/(3 \times 2!)$$

$$\beta_2(k) = \delta^{-1}(k)P_D(1 - P_D P_G)^2 \lambda^2 \exp(-\lambda V_k)$$
$$N\{y_1; \bar{y}_1, S_1\}P_E(k|k - 1)/(3 \times 2!)$$

$$\beta_3(k) = \delta^{-1}(k)P_D(1 - P_D P_G)^2 \lambda^2 \exp(-\lambda V_k)$$
$$N\{y_3; \bar{y}_2, S_2\}P_E(k|k - 1)/(3 \times 2!)$$

$$\beta_4(k) = \delta^{-1}(k)P_D^2(1 - P_D P_G)\lambda \exp(-\lambda V_k)$$
$$N\{y_1; \bar{y}_1, S_1\}N\{y_3; \bar{y}_2, S_2\}P_E(k|k - 1)/(2 \times 1!)$$

$$\beta_5(k) = \delta^{-1}(k)P_D^2(1 - P_D P_G)\lambda \exp(-\lambda V_k)$$
$$N\{y_2; \bar{y}_1, S_1\}N\{y_3; \bar{y}_2, S_2\}P_E(k|k - 1)/(2 \times 1!)$$

where $N\{y; \bar{y}, S\}$ is a multivariate Gaussian density in y with mean $\bar{y}$ and covariance S, and $\delta(k)$ is a normalisation constant, chosen to ensure that the association probabilities sum to unity.

The updated target state estimate for the filter is obtained by summing the conditional state estimates with weightings determined by their respective association probabilities as $$\hat{x}(k|k) = \{\beta_{-1}(k) + \beta_0(k)\}\hat{x}(k|k - 1) + \sum_{i=1}^{5} \beta_i(k)\hat{x}_i(k|k). \quad (20)$$

The state error covariance $P(k|k)$ is obtained using standard techniques from Gaussian mixtures described in Y. Bar-Shalom and T. E. Fortmann, "Tracking and Data Association", Academic Press, 1988 as $$P(k|k) = \{c\beta_{-1}(k) + \beta_0(k)\}P(k|k - 1) + \quad (21)$$
$$\{\beta_{-1}(k) + \beta_0(k)\}\hat{x}(k|k - 1)\hat{x}(k|k - 1)' - \hat{x}(k|k)\hat{x}(k|k)' +$$
$$\sum_{i=1}^{5} \beta_i(k)\{P_i(k|k) + \hat{x}_i(k|k)\hat{x}_i(k|k)'\}.$$

The updated probability of target existence $P_E(k|k)$ is obtained as $$P_E(k|k) = 1 - \beta_{-1}(k). \quad (22)$$

Track maintenance is achieved by thresholding the target existence probability according to $$P_E(k|k) < P_{DEL} \Rightarrow \text{delete track} \quad (23)$$
$$P_E(k|k) > P_{CON} \Rightarrow \text{confirm track}$$
$$P_{DEL} \leq P_E(k|k) \leq P_{CON} \Rightarrow \text{retain track as tentative}$$

where $P_{DEL}$ and $P_{CON}$ are the track maintenance thresholds. Note $P_{DEL} < P_{CON}$. Since $P_E(k|k)$ may vary considerably from dwell to dwell, it is better to use the average value of $P_E(k|k)$ over the last few dwells for track confirmation in equation (23).

The above method is easily extended to arbitrary numbers of measurements falling inside the validation gates and to arbitrary numbers of propagation modes. Arbitrary clutter probability density functions and non-identical gate and detection probabilities are also easily accommodated within this framework.

A tracking filter as described above has been implemented in software using the C programming language and executed on a Digital Equipment Corporation 175 MHz Alpha workstation. The preferred implementation assumes 4 propagation modes corresponding to $F_0$–$F_0$, $F_0$–$F_1$, $F_1$–$F_0$ and $F_1$–$F_1$. The virtual heights of the $F_0$ and $F_1$. ionospheric layers are included as state variables in equation (7) and these are estimated from noisy measurements along with the range, azimuth, range rate and azimuth rate of the target.

Many modifications will be apparent to those skilled in the art without departing from the scope of the present invention as herein described with reference to the accompanying drawings.

What is claimed is:

1. A tracking method for a signal echo system, including:
   generating a plurality of gates for respective propagation modes on the basis of a target state prediction for a dwell time; and
   generating a target state estimate for said dwell time on the basis of target measurement points which fall within said gates.

2. A tracking method as claimed in claim 1, including:
   obtaining initial target measurement points for an initial dwell time;
   initiating tracking by obtaining an initial target state estimate from at least one of said initial points; and determining said target state prediction for a dwell time subsequent to said initial time on the basis of said initial target state estimate.

3. A tracking method as claimed in claim 2, wherein a target state estimate is generated by applying association hypotheses to said measurement points in said gates and association probabilities to said hypotheses, obtaining conditional state estimates from the measurement points for each hypothesis and summing said conditional state estimates multiplied by said probabilities.

4. A tracking method as claimed in claim 3, wherein the probability of existence $P_E$ of a target track is obtained from at least one of said association probabilities and if $P_E$ is less than a predetermined threshold a target track maintained using said target state estimate is deleted.

5. A tracking method as claimed in claim 4, wherein said measurement points are candidate detection points in RAD space obtained from dwells.

6. A tracking method as claimed in claim 5, wherein said target state prediction is obtained from said target state estimate using linear equations of motion.

7. A tracking method as claimed in claim 6, wherein said gates are validation gates having an ellipsoidal shape in RAD space and obtained by transposing said target state prediction to RAD space for respective propagation modes to obtain measurement predictions and associated prediction covariances for respective propagation modes defining said validation gates.

8. A tracking method as claimed in claim 7, wherein said hypotheses include target does not exist, the measurement points in said gates represent clutter, and a measurement point in at least one of said gates represents a target detection.

9. A tracking method as claimed in claim 2, wherein the tracking initiating step is performed for a plurality of propagation modes to initiate a plurality of tracking filters by generating a plurality of said initial target state estimates.

10. A tracking method for a signal echo system, including extending a target state vector to include additional parameters associated with a plurality of propagation modes, generating a plurality of gates for said propagation modes, and accounting for measurement uncertainty associated with propagation path characteristics for said modes when updating target state estimates for a dwell time on the basis of measurements which fall within the gates.

* * * * *

UNITED STATES PATENT AND TRADEMARK OFFICE
CERTIFICATE OF CORRECTION

PATENT NO. : 6,243,037B1
DATED : June 5, 2001
INVENTOR(S) : Graham William Pulford et al.

It is certified that error appears in the above-identified patent and that said Letters Patent is hereby corrected as shown below:

Column 4,
Line 39, change "*and a*" to -- *and $\dot{a}$* --.

Column 6,
Line 50, delete Equation (11) and replace with the following:
-- $P1/0)=F(O)P(O/O)F^1(O)+Q(O)$ --.
Line 52, change "where F" to -- where $F^1$ --.

Column 9,
Line 10, delete the equation and replace with the following:

$$--P_4(k/k) = \bar{P} - \bar{P}(J'_1 J'_2) \begin{pmatrix} \bar{S_1} & J_1\bar{P}J'_2 \\ J_2\bar{P}J'_1 & \bar{S_2} \end{pmatrix}^{-1} \begin{pmatrix} J_1 \\ J_2 \end{pmatrix} \bar{P} --$$

Line 14, delete the equation and replace with the following:

$$--P_4(k/k) = \bar{P} - \bar{P}(J'_1 J'_2) \begin{pmatrix} \bar{S_1} & J_1\bar{P}J'_2 \\ J_2\bar{P}J'_1 & \bar{S_2} \end{pmatrix}^{-1} \begin{pmatrix} J_1 \\ J_2 \end{pmatrix} \bar{P} --$$

Line 61, delete "iny" and insert therefor -- y --.

Signed and Sealed this

Seventh Day of May, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,243,037 B1
DATED         : June 5, 2001
INVENTOR(S)   : Graham William Pulford et al.

It is certified that error appears in the above-identified patent and that said Letters Patent is hereby corrected as shown below:

Column 9,
Line 14, delete the equation and replace with the following:

$$-- P_5(k/k) = \bar{P} - \bar{P}(J'_1 \; J'_2) \begin{pmatrix} \bar{S_1} & J_1 \bar{P} J'_2 \\ J_2 \bar{P} J'_1 & \bar{S_2} \end{pmatrix}^{-1} \begin{pmatrix} J_1 \\ J_2 \end{pmatrix} \bar{P} --$$

Line 61, delete "iny" and insert therefor -- in y --.

Signed and Sealed this

Seventeenth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.    : 6,243,037 B1
DATED         : June 5, 2001
INVENTOR(S)   : Graham William Pulford et al.

It is certified that error appears in the above-identified patent and that said Letters Patent is hereby corrected as shown below:

Column 4,
Line 40, after "ground range rate and", change "a" to -- $\dot{a}$ --.

Column 6,
Line 50, delete Equation (11) and replace with the following:
-- $P1/0)=F(O)P(O/O)F^1(O)+Q(O)$ --.
Line 52, change "where F" to -- where $F^1$ --.

Column 9,
Line 10, delete the equation and replace with the following:

$$-- P_4(k/k) = \bar{P} - \bar{P}(J'_1, J'_2) \left( J_2 \bar{P} J'_1 \begin{matrix} S_1 \\ S_2 \end{matrix} \begin{matrix} J_1 \bar{P} J'_2 \end{matrix} \right)^{-1} \begin{pmatrix} J_1 \\ J_2 \end{pmatrix} \bar{P} --$$

Line 14, delete the equation and replace with the following:

$$-- P_5(k/k) = \bar{P} - \bar{P}(J'_1, J'_2) \left( J_2 \bar{P} J'_1 \begin{matrix} S_1 \\ S_2 \end{matrix} \begin{matrix} J_1 \bar{P} J'_2 \end{matrix} \right)^{-1} \begin{pmatrix} J_1 \\ J_2 \end{pmatrix} \bar{P} --$$

Line 61, delete "iny" and insert therefor -- in y --.

This certificate supersedes Certificates of Correction issued May 7, 2002 and December 17, 2002.

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,243,037B1
DATED         : June 5, 2001
INVENTOR(S)   : Graham William Pulford et al.

It is certified that error appears in the above-identified patent and that said Letters Patent is hereby corrected as shown below:

Column 4,
Line 40, after "ground range rate and", change "a" to -- a --.

Column 9,
Line 10, delete the equation and replace with the following:

$$-- P_4(k/k) = \bar{P} - \bar{P}(J'_1, J'_2) \begin{pmatrix} S_1 & J_1 \bar{P} J'_2 \\ J_2 \bar{P} J'_1 & S_2 \end{pmatrix}^{-1} \begin{pmatrix} J_1 \\ J_2 \end{pmatrix} \bar{P} --$$

Line 14, delete the equation and replace with the following:

$$-- P_5(k/k) = \bar{P} - \bar{P}(J'_1, J'_2) \begin{pmatrix} S_1 & J_1 \bar{P} J'_2 \\ J_2 \bar{P} J'_1 & S_2 \end{pmatrix}^{-1} \begin{pmatrix} J_1 \\ J_2 \end{pmatrix} \bar{P} --$$

Line 61, delete "iny" and insert therefor -- in y --.

This certificate supersedes Certificate of Correction issued May 7, 2002, December 17, 2002 and September 9, 2003.

Signed and Sealed this

Sixth Day of January, 2004

JAMES E. ROGAN
*Director of the United States Patent and Trademark Office*